United States Patent
Romijn

(10) Patent No.: US 6,471,302 B1
(45) Date of Patent: Oct. 29, 2002

(54) HUB CAP WITH PICTURE

(75) Inventor: Wim Romijn, Hellevoetsluis (NL)

(73) Assignee: Logo-Motive Systems B.V., Hellevoetsluis (NL)

( * ) Notice: Subject to any disclaimer, the term of this patent is extended or adjusted under 35 U.S.C. 154(b) by 0 days.

(21) Appl. No.: 09/763,101

(22) PCT Filed: Jul. 12, 1999

(86) PCT No.: PCT/NL99/00441

§ 371 (c)(1),
(2), (4) Date: Jun. 26, 2001

(87) PCT Pub. No.: WO00/09347

PCT Pub. Date: Feb. 24, 2000

(30) Foreign Application Priority Data

Aug. 17, 1998 (NL) .............................................. 1009883

(51) Int. Cl.⁷ ................................................. B60B 7/20
(52) U.S. Cl. ................................ 301/37.25; 301/37.109
(58) Field of Search ......................... 301/37.102, 37.25, 301/37.109; 40/587

(56) References Cited

U.S. PATENT DOCUMENTS 1,432,274 A * 10/1922 Braucher
3,155,430 A 11/1964 Schindler .................. 301/37.25
5,016,944 A 5/1991 Schultz ..................... 301/37.25
6,045,195 A * 4/2000 Okamoto

FOREIGN PATENT DOCUMENTS

| GB | 2 317 149 | 3/1998 |
| WO | WO 99/04987 | 2/1999 |
| WO | WO 99/33675 | 7/1999 |

* cited by examiner

Primary Examiner—Russell D. Stormer
(74) Attorney, Agent, or Firm—Delbert J. Barnard; Joan H. Pauly

(57) ABSTRACT

A hub cap (3) with a picture for a rim (2) of a wheel of a vehicle comprises a housing connected to the rim (2) and a disc connected rotatably to the housing (4). The picture is arranged on the side of the disc (5) remote from the housing. The rotatable connection between the housing and the disc is formed by a pivot pin (6) which is received rotatably in a pivot hole. A mass is connected to the disc at a distance from the pivot pin. The mass (11) is connected to the disc for pivoting on a first shaft parallel to the pivot pin, so that the stabilizing effect of the mass (11) on the disc works better during rotation of the rim.

24 Claims, 3 Drawing Sheets

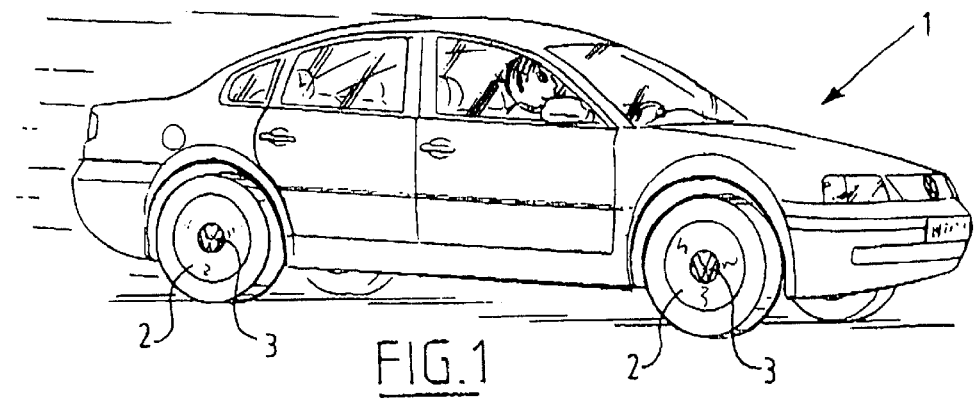
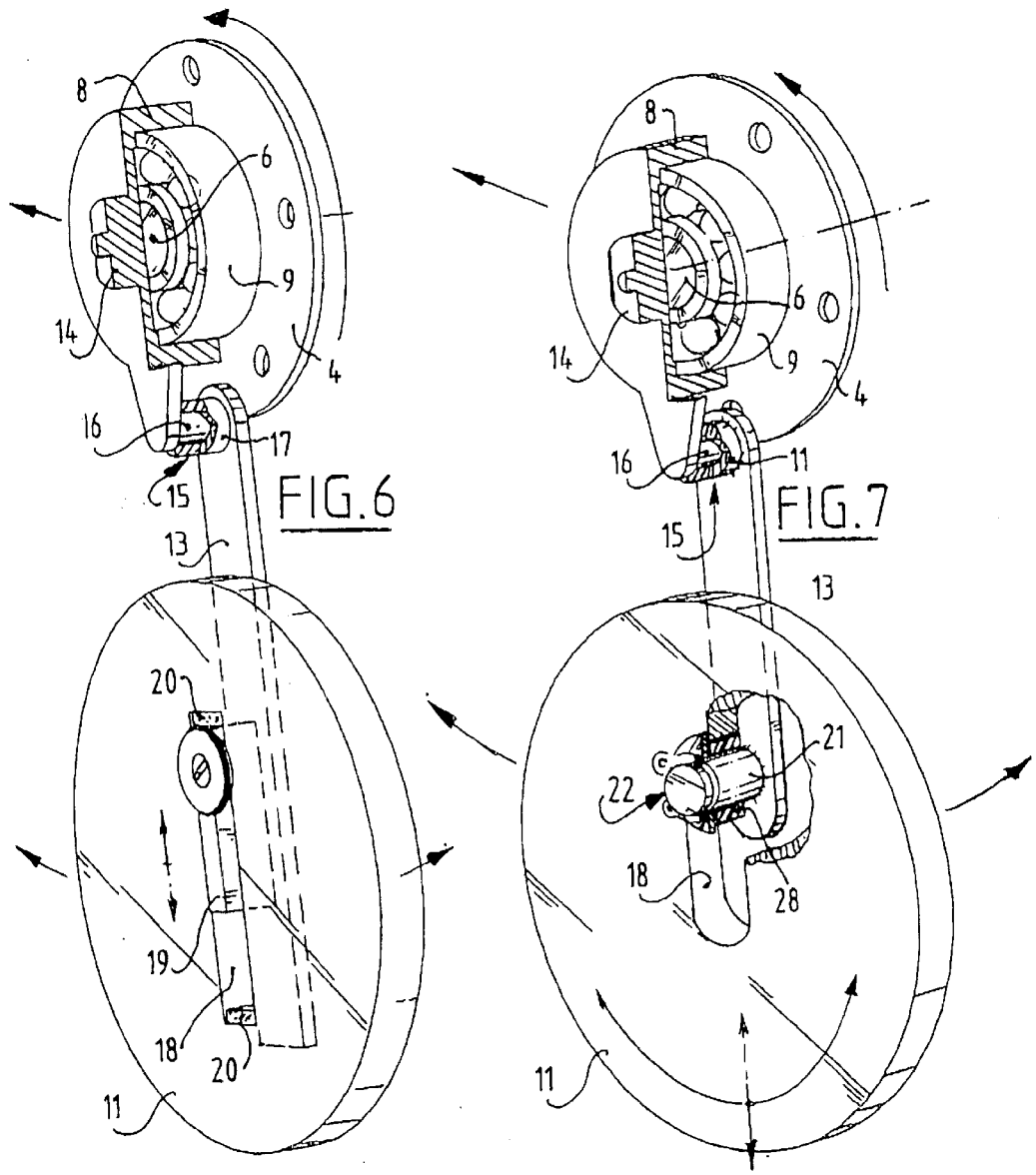

HUB CAP WITH PICTURE

TECHNICAL FIELD

The invention relates to a hub cap with picture for a rim of a wheel of a vehicle, comprising a housing connected to the rim, a disc connected rotatably to the housing, on the side of which disc remote from the housing the picture is arranged, wherein the rotatable connection between housing and disc is formed by a pivot pin which is received rotatably in a pivot hole, and a mass which is connected to the disc at a distance from the pivot pin.

BACKGROUND INFORMATION

Such a hub cap is used during rotation of the rim to hold the disc with picture in a stable position of equilibrium, such that the picture is visible when the vehicle moves and will always be displayed upright when the vehicle is stationary.

Tests have shown that this hub cap does not function adequately. The picture is still co-rotated somewhat during rotation of the rim.

SUMMARY OF THE INVENTION

The invention has for its object to provide an improved hub cap. For this purpose the hub cap has the feature that the mass is connected to the disc for pivoting on a first shaft parallel to the pivot pin. Because the mass has a smaller moment of inertia than the disc, the disc will undergo a smaller angular displacement than the mass during acceleration or deceleration of the vehicle. The relatively larger angular displacement of the mass will result in this case in a better, or in any case quicker, stabilization of the disc.

The first shaft is preferably located close to the pivot pin so as to enhance the above-described effect as much as possible.

In addition, the mass is preferably arranged for displacement in radial direction relative to the first shaft. Hereby is prevented that the stabilization effect is negatively affected by movements of the wheel in a direction perpendicular to the direction of travel of the vehicle. If a vehicle drives for instance through a pot-hole, the mass can absorb this jolt by displacing in radial direction.

In this case it is advantageous if damping means are provided for slowing the movement of the mass in the radial direction.

In a preferred embodiment the mass is arranged relative to the first shaft for pivoting on a second shaft located at a distance from the first shaft and the pivot pin. It has been found from tests that this further enhances the stabilizing effect of the mass on the disc.

The disc is provided with a hub for receiving the pivot pin arranged on the housing. In this embodiment the hub is stationary. This prevents the mass coming into contact with rotating elements of the hub cap, whereby the mass would receive an extra impulse during deceleration or acceleration of the vehicle, this having a negative effect on the stabilizing action thereof.

BRIEF DESCRIPTION OF THE DRAWINGS

The invention will be further elucidated with reference to the annexed drawing. In the drawing:

FIG. 1 shows a perspective view of a vehicle provided with hub caps according to the present invention, FIG. 6 is a partly cross-sectional perspective view of a part of the hub cap according to a fourth embodiment, and FIG. 7 is a partly cross-sectional perspective view of a part of the hub cap according to a fifth embodiment.

Corresponding components are designated in the figures with the same reference numerals.

FIG. 1 shows a vehicle 1 with rims 2 on which are arranged hub caps 3 with a picture.

DETAILED DESCRIPTION OF THE INVENTION

Figure 2:
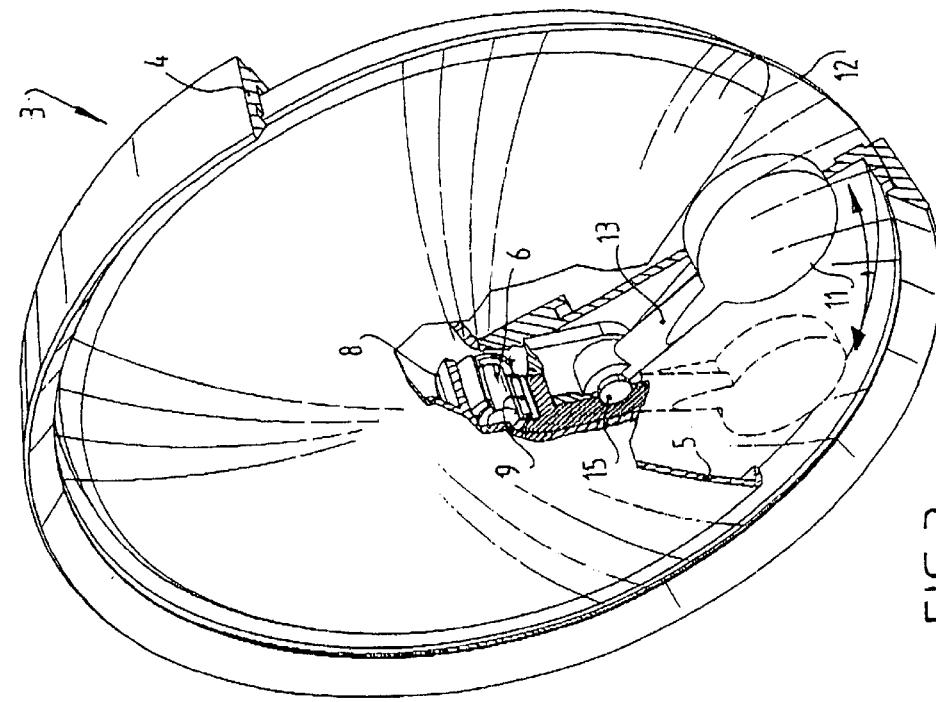
FIG. 2 shows a first embodiment of the hub cap according to the invention in partly cross-sectional perspective view.

FIG. 2 shows in perspective and partly in cross-section a first embodiment of a hub cap 3 according to the invention. Hub cap 3 comprises a housing 4 connected to rim 2 (not shown here), a disc 5 connected rotatably to housing 4 and a mass 11. The picture is arranged on the side of disc 5 remote from housing 4. The rotatable connection between housing 4 and disc 5 is formed by a pivot pin 6 which is received rotatably in a pivot hole 7. Pivot hole 7 is formed by a hub 8 protruding from disc 5. It is also possible to provide housing 4 with a hub 8 and to arrange pivot pin 6 on disc 5. The rotatable connection shown in FIG. 2 is however recommended, since hub 8 is in this case stationary and mass 11 can then not come into contact with any rotating components of hub cap 3.

A roller bearing 9 is arranged between pivot pin 6 and pivot hole 7. Bearing 9 provides a rotation movement with reduced friction of pivot pin 6 in pivot hole 7. In addition, at a distance from pivot pin 6 the mass 11 is pivotally connected to disc 5 by means of a first shaft 15 parallel to pivot pin 6.

On the side of the picture the housing 4 is closed by a circular plate 12 of transparent material. Transparent plate 12 is preferably fixed to housing 4 such that hub cap 3 is watertight and dustproof. In addition, housing 4 is provided on the side remote from the picture with a circular protruding part 10 with an overhanging edge 10a (see also FIG. 5), by means of which the hub cap 3 can be coupled to rim 2.

Figure 3:
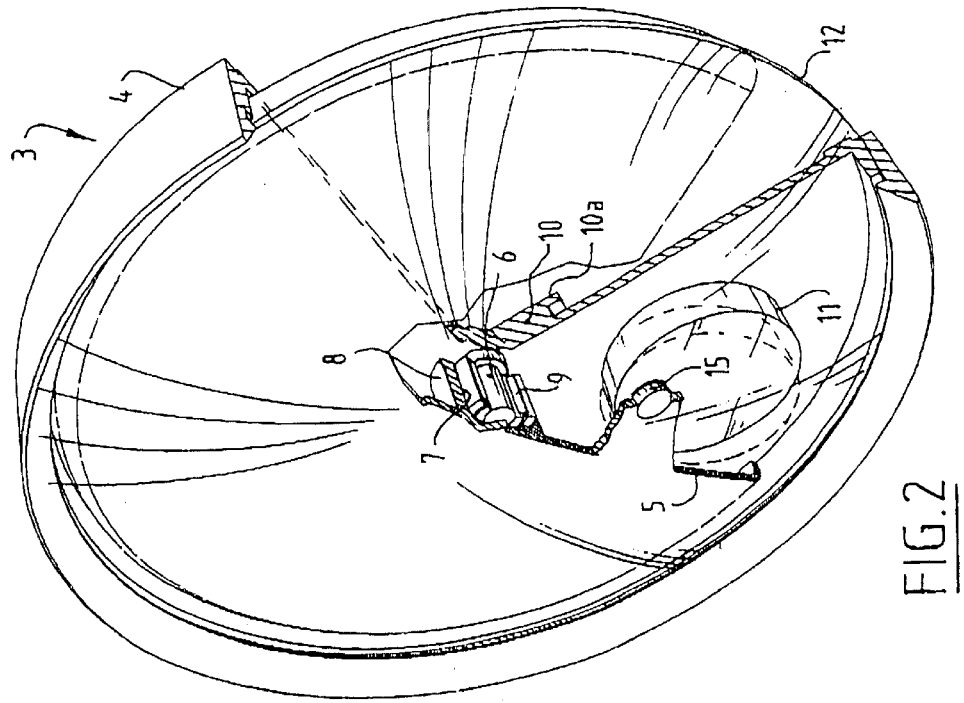
FIG. 3 shows a second embodiment of the hub cap according to the invention in partly cross-sectional perspective view.

FIG. 3 shows a second embodiment of the hub cap 3 according to the invention. In this embodiment the first shaft 15 is located close to pivot pin 6. In contrast to the first embodiment, the mass 11 is located substantially at a distance from first shaft 15 since a connecting arm 13 is arranged between first shaft 15 and the circular mass 11. Instead of a rigid connection between mass 11 and first shaft 15, mass 11 can also be suspended from first shaft 15 by means of for instance a cord.

Figure 5:
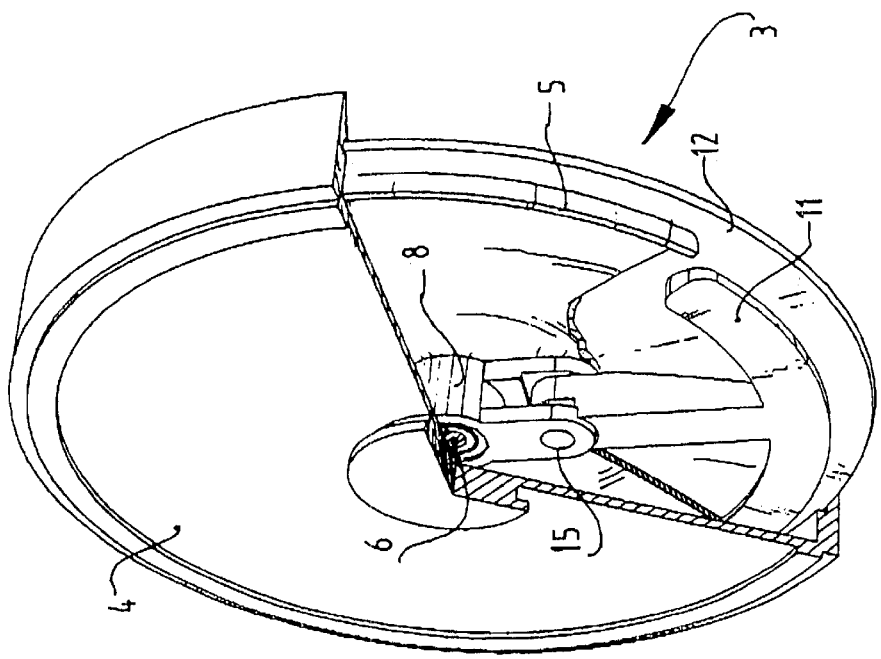
FIG. 5 shows the embodiment of FIG. 4 as seen from the rear.
Figure 4:
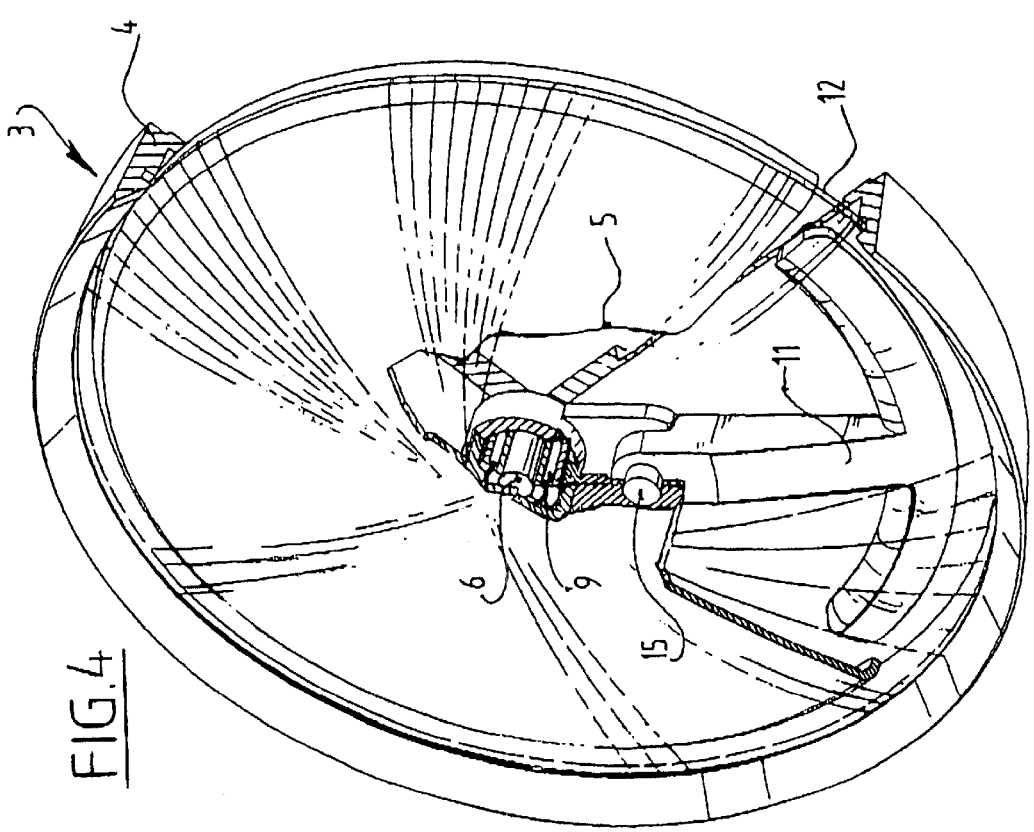
FIG. 4 shows a third embodiment of the hub cap according to the invention in partly cross-sectional perspective view, as seen from the front.

A third embodiment of the hub cap 3 according to the invention is shown in FIGS. 4 and 5; in FIG. 4 from the front (the side of the picture) and in FIG. 5 from the rear. Mass 11 has the shape of en anchor in this embodiment. Here also the stabilization mass 11 is situated substantially at a distance from first shaft 15, whereby the greatest possible moment, and therefore stabilizing effect, is obtained.

FIGS. 6 and 7 show respectively a fourth and fifth embodiment of a hub cap 3 according to the invention, whereby the transparent plate 12 and disc 5 have been omitted. Disc 5 is fixed to hub 8 by means of a part 14 extending from hub 8. For this purpose the disc 5 is provided with a hole (not shown in the figures) which co-acts in unequivocal manner with the protruding part 14.

A wall of hub 8 remote from housing 4 is extended downward and carries a pin 16, which is received pivotally in a second hub 17 on the connecting arm 13. This pin 16 and hub 17 form the first shaft 15. Via hub 8 and protruding part 14 the mass 11 is connected to disc 5 for pivoting on this first shaft 15.

In FIG. 6 the mass 11 is provided with a guide slot 18 in which engages a guide block 19 arranged on connecting arm 13. Mass 11 is hereby movable in radial direction relative to first shaft 15. Damping means 20, for instance rubber elements, are further arranged in guide slot 18 to slow the radial movement of mass 11.

In the fifth embodiment of FIG. 7 a guide pin 21 is arranged on connecting arm 13, which pin engages in guide slot 18. Mass 11 is hereby not only displaceable in radial direction but can also pivot on guide pin 21 relative to first shaft 15. Guide pin 21 forms a second shaft 22 which is situated at a distance from first shaft 15 and pivot pin 6 and on which the mass 11 is arranged pivotally relative to first shaft 15. Finally, a rubber sleeve 20 is arranged around guide pin 21 for damping of the mass 11.

A better stabilizing effect is realized relative to the hub caps known from the prior art by connecting the mass 11 to disc 5 for pivoting on a first shaft 15. Since disc 5 has a larger moment of inertia than mass 11, disc 5 will undergo a smaller angular displacement than mass 11 during deceleration or acceleration of vehicle 1 and therefore also return more rapidly to its position of equilibrium. This positive effect is only enhanced by arranging mass 11 at a distance from its pivot shaft 15 and pivot shaft 15 close to hub 8. By ensuring that mass 11 can also displace in radial direction and can optionally pivot on a second shaft 22 it is possible to prevent the stabilization effect being negatively affected by movements of the wheel in a direction perpendicular to the direction of travel, such as when the vehicle drives through a hole in the road surface.

The invention is otherwise not limited to use in passenger cars, but can also be used in trucks, tankers, trailers, buses and so on. It is thus possible to provide the wheels of trucks, buses and so on with hub caps 3 with advertising pictures which, as a result of the stabilization mechanism according to the invention, remain stationary and upright in all conditions during travel.

What is claimed is:

1. A hub cap (3) with a picture for a rim (2) of a wheel of a vehicle (1), comprising a housing (4) connectable to the rim (2), a disc (5) connected rotatably to the housing (4) by a rotatable connection, on a side of which disc remote from the housing (4) the picture is arranged, wherein the rotatable connection between the housing (4) and the disc (5) is formed by a pivot pin (6) which is received rotatably in a pivot hole (7), a first shaft (15) parallel to the pivot pin (6), and a mass (11) which is pivotally connected to the disc (5) at a distance from the pivot pin (6), wherein the mass (11) is connected to the disc (5) for pivoting on the first shaft (15).

2. Hub cap (3) as claimed in claim 1, characterized in that the first shaft (15) is located close to the pivot pin (6).

3. Hub cap (3) as claimed in claim 2, characterized in that the mass (11) is arranged for displacement in a radial direction relative to the first shaft (15).

4. Hub cap (3) as claimed in claim 1, characterized in that the mass (11) is arranged for displacement in a radial direction relative to the first shaft (15).

5. Hub cap (3) as claimed in claim 4, characterized in that damping means (20) are provided for slowing the movement of the mass (11) in the radial direction.

6. Hub cap (3) as claimed in claim 3, characterized in that damping means (20) are provided for slowing the movement of the mass (11) in the radial direction.

7. Hub cap (3) as claimed in claim 6, further comprising a second shaft (22) located at a distance from the first shaft (15) and the pivot pin (6), the mass (11) being arranged to pivot on the second shaft (22) relative to the first shaft (15).

8. Hub cap (3) as claimed in claim 5, further comprising a second shaft (22) located distance from the first shaft (15) and the pivot pin (6), the mass (11) being arranged to pivot on the second shaft (22) relative to the first shaft (15).

9. Hub cap (3) as claimed in claim 4, further comprising a second shaft (22) located at a distance from the first shaft (15) and the pivot pin (6), the mass (11) being arranged to pivot on the second shaft (22) relative to the first shaft (15).

10. Hub cap (3) as claimed in claim 3, further comprising a second shaft (22) located at a distance from the first shaft (15) and the pivot pin (6), the mass (11) being arranged to pivot on the second shaft (22) relative to the first shaft (15).

11. Hub cap (3) as claimed in claim 2, further comprising a second shaft (22) located at a distance from the first shaft (15) and the pivot pin (6), the mass (11) being arranged to pivot on the second shaft (22) relative to the first shaft (15).

12. Hub cap (3) as claimed in claim 1, further comprising a second shaft (22) located at a distance from the first shaft (15) and the pivot pin (6), the mass (11) being arranged to pivot on the second shaft (22) relative to the first shaft (15).

13. Hub cap (3) as claimed in claim 12, characterized in that the disc (5) is provided with a hub (8) for receiving the pivot pin (6) arranged on the housing (4).

14. Hub cap (3) as claimed in claim 11, characterized in that the disc (5) is provided with a hub (8) for receiving the pivot pin (6) arranged on the housing (4).

15. Hub cap (3) as claimed in claim 10, characterized in that the disc (5) is provided with a hub (8) for receiving the pivot pin (6) arranged on the housing (4).

16. Hub cap (3) as claimed in claim 9, characterized in that the disc (5) is provided with a hub (8) for receiving the pivot pin (6) arranged on the housing (4).

17. Hub cap (3) as claimed in claim 8, characterized in that the disc (5) is provided with a hub (8) for receiving the pivot pin (6) arranged on the housing (4).

18. Hub cap (3) as claimed in claim 7, characterized in that the disc (5) is provided with a hub (8) for receiving the pivot pin (6) arranged on the housing (4).

19. Hub cap (3) as claimed in claim 6, characterized in that the disc (5) is provided with a hub (8) for receiving the pivot pin (6) arranged on the housing (4).

20. Hub cap (3) as claimed in claim 5, characterized in that the disc (5) is provided with a hub (8) for receiving the pivot pin (6) arranged on the housing (4).

21. Hub cap (3) as claimed in claim 4, characterized in that the disc (5) is provided with a hub (8) for receiving the pivot pin (6) arranged on the housing (4).

22. Hub cap (3) as claimed in claim 3, characterized in that the disc (5) is provided with a hub (8) for receiving the pivot pin (6) arranged on the housing (4).

23. Hub cap (3) as claimed in claim 2, characterized in that the disc (5) is provided with a hub (8) for receiving the pivot pin (6) arranged on the housing (4).

24. Hub cap (3) as claimed in claim 1, characterized in that the disc (5) is provided with a hub (8) for receiving the pivot pin (6) arranged on the housing (4).

* * * * *